United States Patent Office 3,335,018
Patented Aug. 8, 1967

3,335,018
COMPOSITION AND METHOD FOR
STABILIZING SOIL
Cletus E. Peeler, Jr., and Allan D. Bergmann, Painesville, and Donald J. Olix, Fairport Harbor, Ohio, assignors to Diamond Alkali Company, Cleveland, Ohio, a corporation of Delaware
No Drawing. Filed Apr. 20, 1964, Ser. No. 361,242
17 Claims. (Cl. 106—76)

This invention relates to new and improved alkali metal silicate-containing compositions and their use in the solidification or stabilization of soil impregnated therewith. More particularly, the present invention relates to a new and improved method of strengthening soil by incorporating therein an alkali metal silicate-cement containing soil stabilizing composition.

Several approaches made in attempts to strengthen substrata or render porous substrata impermeable to water have become well known and widely used. For instance, prior practice generally has involved the successive injection of two separate liquids, the first of which is capable of either combining chemically with a second reactant or catalyzed by the second reactant within the soil to form either a rigid gel or a solid insoluble polymer achieving in situ the desired soil stabilization and solidification. However, in using successive injections of the different reactants which heretofore generally have been necessary to avoid premature gelling it has been found that there frequently occurs an undesired gelation or polymerization at the immediate site of injection which tends there to plug the soil pores and prevent uniform mixing and reaction of the first reactant with either the gelling agent or polymerization initiator. Accordingly, there is obtained in many instances a non-uniform gel or polymerizate structure in the soil with the resultant non-gelled or non-polymerized section where stabilization is desired.

Generally, in order to increase gelation time and move the soil stabilization composition into the soil to obtain a homogeneous mixture of soil and stabilization composition, it has been the practice to dilute the soil stabilizing composition; however, it has been found that the strength of the resultant gel or polymerizate is relatively low. Further dilution of the soil stabilizing composition adds the further disadvantage of handling large volumes of dilute aqueous mixtures with the resultant increased equipment and labor costs.

Accordingly, it is the principal object of the present invention to avoid the difficulties of the prior art techniques of soil solidification and to provide a new and improved composition adapted for use in soil stabilization.

A further object of this invention is to provide a new and improved alkali metal silicate-cement-containing grout composition of controllable water solubility and gel time.

A still further object of the present invention is to provide a new and improved alkali metal silicate-cement-containing grout composition characterized by an increased strength over chemical grouts, i.e., silicate-containing gellable compositions, with the same solids content and increased strength over cement grouts with the same volume.

Another object of the present invention is to provide an alkali metal silicate-cement-containing grout composition characterized by an essentially full set volume, i.e., gallonage of chemical grout and the gallonage of cement give the full volume set without solids settling.

Broadly the present invention comprises a composition of matter and method of using such composition comprising a mixture of (1) an alkali metal silicate; (2) an amide, and (3) a hydraulic cement.

While silicates and hydraulic cements have been used previously in grouting compositions, the resulting grouts are characterized with certain drawbacks. They tend to crack, creep, crumble under charge of surrounding conditions, i.e., temperature, humidity, etc.; they sag during the curing period; their cost is prohibitive for widespread commercial acceptance; they have long set times; they lose or have insufficient compression strengths; and they shrink in volume upon setting. However, with the silicate-amide-hydraulic cement grout composition of the present invention it has been found that the volume percent loss upon drying of the grout composition is appreciably less than those grouting compositions in which one of the essential ingredients, i.e., silicate, amide or hydraulic cement is absent from the grouting formulation. Further, finished grout does not crack upon exposure and the compression strength of the grout composition increases when dried.

Throughout the specifications and claims, the term "alkali metal silicate" is intended to refer to alkali metal silicates having an alkali metal oxide:silicon dioxide weight ratio within the range of from about 1.0:3.0–4.0; notably sodium silicates having a sodium oxide:silicon dioxide weight ratio within the range of from about 1:3.0–4.0, preferably, about 1:3–3.5. An especially preferred material is an aqueous sodium silicate having a sodium oxide:silicon dioxide ratio of about 1:3.2–3.3 and a $Na_2O$—$SiO_2$ solids content of about 35 to 45%. The term "alkali metal," as used in the specification and claims is intended to refer to the various alkali metals, i.e., sodium, potassium, lithium, rubidium, cesium and mixtures thereof. Silicates of potassium and sodium are more generally available. Because of their lower cost and availability, sodium silicates are more widely used and therefore are preferred in the practice of the present invention. Particular reference hereinafter is made to such silicate.

The amides which may be employed in the composition of the present invention are those disclosed in U.S. Patent No. 2,968,572 issued Jan. 17, 1961, to Cletus E. Peeler, Jr., hereby incorporated by reference. The amides have the structure

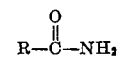

wherein R is selected from the group consisting of hydrogen, lower alkyl groups, such as methyl, ethyl, propyl, butyl, isomers thereof, of the like, —$CONH_2$, lower alkyl —$CONH_2$ groups, wherein the lower alkyl portion is methyl, ethyl, propyl, butyl, isomers thereof, or the like, and water-soluble salts of the foregoing, e.g., alkaline earth metal salts (Ca, Ba and/or Sr) or alkali metal salts and acetates. Specific illustrative amides are formamide, acetamide, propionamide and butyramide. A preferred amide is formamide (M.P. 2.5° C.).

As used in the specification and claims, the term "hydraulic cements" is intended to refer to all mixtures of lime, silica, and alumina; or of lime and magnesia; silica, alumina and iron oxide and other like mixtures of ingredients which set under the action of water. Hydraulic cements include hydraulic limes, grappier cements, puzzolan cements, natural cements, and Portland cements. Puzzolan cements include slag cements made from slaked lime and granulated blast furnace slag. While neat cement is generally desirable, inert granular filler material, or aggregate, such as silt, clay, peat, bentonite, kaolin, shale, vermiculite, limestone, pebbles, cobbles, soil alluvial or loam, silica flour or any of the other well-known inert aggregates may be employed as long as the amount added does not reduce the strength of the cement below desired values.

This invention is especially concerned with compositions of silicate, amide, and hydraulic cement; but also comprises such compositions which additionally contain a reactive salt capable of rapidly reacting with the alkali metal silicate to form with the silicate a completely or substantially water-insoluble gel having an accelerated gel time. In some applications, for example, in the treatment of soil at a depth below the existing water level, ground moisture present could be a disadvantage in dissolving the initially formed gel. Accordingly, in such a situation, it is a preferred practice of this invention that the silicate-amide-hydraulic cement composition employed contain a reactive salt for the purpose of imparting a high degree of initial water-insolubility to the initial gel formed from the 4-component, i.e., silicate-amide-hydraulic cement-reactive salt composition.

The term "reactive salt" is intended to mean those metal salts which chemically react with aqueous alkali metal silicate to produce a completely or substantially water-insoluble gel. Specific reactive salts include sodium aluminate, aluminum chloride, copper sulphate, zinc chloride and calcium chloride, with calcium chloride being preferred. When a reactive salt is used, it is generally incorporated as an aqueous solution with a concentration within the range of about 25 g./liter up to saturation. It will be appreciated that when no such reactive salt is employed the inherent advantages of this invention of forming a grout which, upon drying, does not appreciably decrease in its volume and retains or increases in compression strength are achieved equally as well.

Gelation time can be further accelerated when any one of the gel accelerators disclosed in co-pending patent application Ser. No. 292,073, filed July 1, 1963, hereby incorporated by reference, are present in the stabilizing composition of the present invention.

From the discussion of the invention thus far it will be understood that the composition of this invention incorporates at least sufficient water to render the composition fluid to form a pumpable slurry. However, except in those instances where a dilute solution is desired for reasons of economy and to enhance injectivity, substantial dilution is to be avoided. Generally, at least a portion of the necessary water may advantageously be incorporated by using a commercial aqueous alkali metal silicate described above with additional water being added if desired as by an admixture of the water with the amide and, if used, the reactive salt and gel accelerator solutions.

It will be appreciated that the proportions of alkali metal silicate, amide, hydraulic cement, added water and, if used, the reactive salt as well as the amount of soil treated with a given quantity of such a composition varies widely depending on the porosity, permeability, and the type of soil, nature of substrata if sub-soil application is intended and the like. Accordingly, it generally is not feasible to define in terms of proportions a composition which represents an optimum material for use in all types of solidification and/or stabilization operation. However, effective soil stabilizing compositions of the present invention comprise from about 40 to 97%, preferably about 42 to 80%, by volume, of the silicate-amide mixture and about 3 to 60%, preferably 20 to 58%, by volume, of hydraulic cement with the proviso that the ratio of milliliters of silicate to grams of cement is at least 1:1, with a maximum ratio of milliliters of silicate to grams of cement being about 7:1. Preferably, the ratio of silicate to cement should be within the range of about 1 to 2.5:1. The silicate-amide mixture contains for practical purposes about 5 to 98%, preferably 35 to 75%, by volume, of the mixture of a commercial aqueous alkali silicate, e.g., sodium silicate, typically containing about 35 to 45% solids; about 2 to 30%, preferably 2 to 15%, by volume, of the mixture of an amide; if a reactive salt solution is to be used in addition to the amide, the silicate-amide mixture may contain about 0 to 50%, preferably, about 5 to 20%, by volume, of the total mixture of a reactive salt; and the balance of the silicate-amide mixture being added water (water beyond that separately admixed with either alkali metal silicate, amide and reactive salt).

The amount of reactive salt, when used, is insufficient if used alone with the silicate, to form a satisfactory gel. However, if storage of the silicate-amide-reactive salt mixture is to be required prior to injection in the soil, incorporation of the reactive salt directly into the alkali metal silicate solution is not recommended because of the gelling which will occur. Preferably, if the reactive salt solution is to be used it is premixed with the amide and added to the alkali metal silicate solution just prior to the addition of the silicate-amide-reactive salt mixture to the cement slurry described herein below.

The hydraulic cement may be added to the composition in the form of a slurry either by incorporating it into the alkali metal silicate-amide solution directly or by adding the cement slurry to the amide, or if a reactive salt is to be used in addition to the amide, to the amide-reactive salt solution, and then combining it with the alkali metal silicate to form the soil stabilizing composition. Preferably, however, the hydraulic cement slurry is not added until the alkali metal silicate solution is added to the amide and if a reactive salt is also used, to amide-reactive salt components before addition of the cement slurry and advantageously just prior to injection of the grouting composition into the soil. Cement slurries of suitable pumping consistency may be prepared by mixing the hydraulic cement with water in a cement to water weight ratio range of about 1.0:05 to 9, preferably, about 1.0:0.8 to 4.5.

The term "soil," as used in the specification and claims is intended to refer to various types and compositions of soil, including sand, loam, porous or fissured rock and the like; for example, as described on pages 614–633 of vol. 12 of the Kirk-Othmer Encyclopedia of Chemical Technology.

In order that those skilled in the art may more completely understand the present invention and the preferred method by which the same may be carried into effect the following specific examples may be offered:

*Example 1*

Into a series of 16 ounce canisters are placed designated amounts of Portland cement-water slurries having a weight ratio of cement to water of 1:1.33. The cement slurries are continually agitated and varying amounts of a silicate amide solution are added to each of the canisters containing the cement slurries. The silicate-amide solution is made up as follows: 175 grams (125 milliliters) of sodium silicate, grade 40 (1 $Na_2O:3.22\ SiO_2$, average solid content, 38.35%, by weight, 41.5° Bé. at 20° C.) is mixed with 7.8 milliliters of formamide and the balance added water. The total volume of the silicate solution is 156 milliliters. The resultant silicate-amide solution contains, by volume, 80% sodium silicate, 5% formamide and the remainder water. Agitation of the mixture is continued until the entire formulation is set, i.e., becomes so viscous as to be considered a solid. The set time (time elapsed between the start of mixing the cement slurries and the silicate-amide solution and set) is recorded. After the set, the unoccupied volume of the canister is filled with water and allowed to stand for 48 hours to allow sufficient cure of the silicate-amide-cement grout. Each sample of the series which had been cured under water for 48 hours is allowed to air dry for an additional 48 hours, after which time it is observed and tested for volume loss. The tests are conducted at ambient temperatures. Test results and other pertinent data are reported in Table I.

The benefit from a small decrease of grout volume is realized where the soil grouted area becomes dry as a result of dry weather lowering the water table. Less volume loss in the grout indicates less contraction and less possibility of the aggregate grout losing strength or becoming crumbly.

Example 3

Example 1 is repeated except that the silicate solution contains, by volume, 50% sodium silicate and 50% water. No formamide is present. Two runs are made wherein the concentration of the silicate solution and the cement slurry is varied. The results are reported in Table III.

TABLE I

| Run | Silicate-amide solution, vol. percent | Cement slurry, vol. percent | Ml. silicate: G. cement | Set time, seconds | Air dry at 70° F. for 48 hours | |
|---|---|---|---|---|---|---|
| | | | | | Percent vol. loss | Condition of dry sample |
| 1 | 28.6 | 71.4 | 0.53 | 16 | | Cracked and crumbly. |
| 2 | 37.5 | 62.5 | 0.79 | 20 | | Do. |
| 3 | 44.5 | 55.5 | 1.06 | 24 | 17.73 | Solid. |
| 4 | 50 | 50 | 1.32 | 27 | 5.86 | Do. |
| 5 | 54.5 | 45.5 | 1.58 | 33 | 12.5 | Do. |
| 6 | 58.4 | 41.6 | 1.85 | 40 | 9.75 | Do. |

Example 2

Example 1 is repeated except that the silicate solution of this example does not contain any formamide. The results are reported in Table II.

Example 4

Example 1 is repeated except that the silicate solution contains, by volume, 50% sodium silicate, 5% formamide and 45% water. Two runs are made wherein the concen-

TABLE II

| Run | Silicate-solution, vol. percent | Cement slurry, vol. percent | Ml. silicate: G. cement | Set time, seconds | Air dried at 70° F. for 48 hours | |
|---|---|---|---|---|---|---|
| | | | | | Percent vol. loss | Condition of dried sample |
| 1 | 28.6 | 71.4 | 0.53 | 17 | | Cracked and crumbly. |
| 2 | 37.5 | 62.5 | 0.79 | 22 | | Do. |
| 3 | 44.5 | 55.5 | 1.06 | 26 | | Do. |
| 4 | 50.0 | 50 | 1.32 | 31 | 44.7 | Solid. |
| 5 | 54.5 | 45.5 | 1.58 | 37 | 36.9 | Do. |
| 6 | 58.4 | 41.6 | 1.85 | 44 | 30.4 | Do. |

From a comparison of runs 4, 5 and 6 of Example 1 with the runs of 4, 5 and 6 of Example 2, it may be seen that the grout composition containing formamide has appreciably less volume loss upon air drying for 48 hours. For example, run 4 of Example 1 has a volume loss of 5.86%, whereas run 4 of Example 2 has a volume loss of 44.7%. Run 5 of Example 1 has a volume loss of 12.5%, whereas run 5 of Example 2 has a volume loss of 36.9%. Further, run 6 of Example 1 has a volume loss of 9.75% and run 6 of Example 2 has a volume loss of 30.4%. The volume loss of runs 1 and 2 of Example 1 could not be obtained because the samples cracked after air drying for 48 hours and crumbled when removed from the canister. Likewise, runs 1, 2 and 3 of Example 2 also crumbled when removed from the canister. The runs containing at least 40% of a silicate-amide solution and a ratio of milliliters of silicate to grams of cement in excess of 1:1 in the grout composition have appreciably less volume loss upon air drying than the runs where there is no formamide.

tration of the silicate solution and cement slurry is varied. The results are reported in Table III.

Example 5

Example 1 is repeated except that the silicate solution contains, by volume, 50% sodium silicate, 5% formamide, 5% of a 5% solution of calcium chloride (50 grams per liter) and 40% water. Two runs are made wherein the concentration of silicate solution and cement slurry is varied. The results are reported in Table III.

Example 6

Example 1 is repeated except that the silicate solution contains, by volume, 50% sodium silicate, 5% of a 5% solution of calcium chloride and 45% water. Two runs are conducted wherein the concentration of silicate solution and cement slurry is varied. The results are reported in Table III.

TABLE III

| Example | | Silicate solution, vol. percent | Cement slurry, vol. percent | Ml. silicate: G. cement | Set time, seconds | Unconfined Compression strength, lbs./in.$^2$ | Air dried at 70° F. for 48 hours | |
|---|---|---|---|---|---|---|---|---|
| | | | | | | | Unconfined Compression Strength, lbs./in.$^2$ | Condition of dried sample |
| 3 | Run 1 | 56.6 | 43.4 | 1.08 | 36 | 188 | | Cracked and crumbly. |
| | Run 2 | 67 | 33 | 1.65 | 46 | 43 | | Do. |
| 4 | Run 1 | 56.6 | 43.4 | 1.08 | 37 | 26 | 120 | Solid. |
| | Run 2 | 67 | 33 | 1.65 | 50 | 28 | 128 | Do. |
| 5 | Run 1 | 56.6 | 43.4 | 1.08 | 35 | 31 | 80 | Do. |
| | Run 2 | 67 | 33 | 1.65 | 47 | 20 | 140 | Do. |
| 6 | Run 1 | 56.6 | 43.4 | 1.08 | 36 | 201 | | Cracked and crumbly. |
| | Run 2 | 67 | 33 | 1.65 | 51 | 21 | | Do. |

It may be seen from Examples 4 and 5 that after air drying for 48 hours these runs show an appreciable increase in compression strengths. Also, when the grout does not contain any formamide (Examples 3 and 6) the samples crumble upon removal from the canister and compression strength tests could not be run on these samples.

In Example 4, run 1, after air drying for 48 hours the sample's compression strength increases from 26 pounds per square inch to 120 pounds per square inch. Also, in run 2 the sample's compression strength increases from 28 pounds per square inch to 128 pounds per square inch. Likewise, in run 1 (Example 5) the sample's compression strength increases from 31 pounds per square inch to 80 pounds per square inch and in run 2 (Example 5) the sample's compression strength increases from 20 pounds per square inch up to 140 pounds per square inch.

*Example 7*

Attempts to prepare a formamide-hydraulic cement composition with acceptable set times have failed. No thickening effect is noted over long periods of time.

It is to be understood that although the invention has been described with specific reference to particular embodiments thereof, it is not to be so limited since changes and alterations therein may be made which are within the full intended scope of the invention as defined by the appended claims.

It is claimed:
1. A composition of matter comprising about 40 to 97%, by volume, of an aqueous silicate-amide solution containing an alkali metal silicate having an alkali metal oxide:silicon dioxide weight ratio within the range from about 1:3.0 to 4.0 and an amide having the structure $$\begin{array}{c} O \\ \parallel \\ R-C-NH_2 \end{array}$$

wherein R is a radical selected from the group consisting of hydrogen and a lower alkyl group; said aqueous silicate-amide solution comprising about 5 to 98%, by volume, aqueous alkali metal silicate, about 2 to 30%, by volume, amide and the balance water; and about 3 to 60%, by volume, of a Portland cement in the form of an aqueous slurry comprising the Portland cement and water in a cement to water weight ratio range of about 1.0:0.5 to 9, and the ratio of milliliters of silicate to grams of cement is at least 1:1.

2. The composition of matter as defined in claim 1 wherein the alkali metal silicate is sodium silicate having a Na$_2$O:SiO$_2$ weight ratio of 1:3.0 to 3.5.

3. A composition of matter as defined in claim 1 which additionally contains an aqueous reactive salt solution containing the reactive salt in a concentration from about 25 grams per liter up to saturation in an amount from about 5% to 50%, by volume, based on the volume of the aqueous silicate-amide solution; said reactive salt is capable of forming a substantially water-insoluble gel with said silicate.

4. The composition of matter according to claim 3 wherein the reactive salt is calcium chloride and the reactive salt solution contains 50 grams calcium chloride per liter of solution.

5. A composition of matter according to claim 1 wherein said aqueous alkali metal silicate-amide solution is present in an amount of about 42 to 80%, by volume and said Portland cement slurry is present in an amount of about 20 to 58% by volume.

6. The composition of claim 1 wherein said aqueous alkali metal silicate is present in the aqueous alkali metal silicate-amide solution in an amount between 35 and 75%, by volume.

7. A composition of claim 1 wherein the amide is present in the aqueous alkali metal silicate-amide solution in an amount between 2 and 15%, by volume.

8. The composition of claim 1 wherein the Portland cement and water in the cement slurry are in a cement to water weight ratio range of about 1.0:0.8 to 4.5.

9. The composition of claim 1 wherein the amide is formamide.

10. A composition of matter consisting essentially of about 42 to 80%, by volume, of an aqueous sodium silicate-formamide solution comprising 35 to 75%, by volume, aqueous sodium silicate having a Na$_2$O:SiO$_2$ weight ratio of about 1:3.0 to 4.0, 2 to 15%, by volume, formamide, 0 to 50%, by volume, of a calcium chloride solution, containing 50 grams calcium chloride per liter, and the balance water; and about 20 to 58%, by volume, of a hydraulic cement in the form of an aqueous slurry comprising Portland cement and water in a cement to water weight ratio range of about 1.0:0.8 to 4.5, and the ratio of milliliters of silicate to grams of cement is at least 1:1.

11. The method of treating soil which comprises contacting said soil with a single liquid composition of matter consisting essentially of 40 to 97%, by volume, of an aqueous silicate-amide solution containing an alkali metal silicate having an alkali metal oxide:silicon dioxide weight ratio within the range from about 1:3.0 to 4.0 and an amide having the structure:

$$\begin{array}{c} O \\ \parallel \\ R-C-NH_2 \end{array}$$

wherein R is a radical selected from the group consisting of hydrogen and a lower alkyl group, said aqueous silicate-amide solution comprising about 5 to 98%, by volume, aqueous alkali metal silicate, and about 2 to 30%, by volume, amide, and the balance water; and about 3 to 60%, by volume, of a Portland cement in the form of an aqueous slurry comprising the Portland cement and water in a cement to water weight ratio range of about 1.0:0.5 to 9, and the ratio of milliliters of silicate to grams of cement is at least 1:1.

12. The method of claim 11 wherein the silicate is sodium silicate having a $Na_2O:SiO_2$ weight ratio of about 1:3 to 3.5.

13. The method of claim 11 wherein the amide is formamide.

14. A method according to claim 11 wherein the composition also includes an aqueous reactive salt solution containing the reactive salt in a concentration from about 25 grams per liter up to saturation in an amount from about 5 to 50%, by volume, based on the volume of the aqueous silicate-amide solution; said reactive salt is capable of forming a substantially water-insoluble gel with said silicate.

15. The method according to claim 14 wherein the reactive salt is calcium chloride and the reactive salt solution contains 50 grams calcium chloride per liter of solution.

16. The method of treating soil which comprises contacting said soil with a single liquid composition of matter consisting essentially of about 42 to 80%, by volume, of an aqueous sodium silicate-formamide solution comprising 35 to 75%, by volume, aqueous sodium silicate having a $Na_2O:SiO_2$ weight ratio of about 1:3.0 to 4.0, about 2 to 15%, by volume, formamide, about 5 to 20%, by volume, calcium chloride solution, containing 50 grams calcium chloride per liter, and the balance water; and about 20 to 58%, by volume, of a cement slurry comprising Portland cement and water in a cement to water weight ratio range of about 1.0:0.8 to 4.5 and the ratio of milliliters of silicate to grams of cement is at least 1:1.

17. Soil stabilized by admixture with a composition consisting essentially of about 42 to 80%, by volume, of an aqueous sodium silicate-formamide solution containing 35 to 75%, by volume, aqueous sodium silicate having a $Na_2O:SiO_2$ weight ratio of about 1:3.0 to 4.0, about 2 to 15%, by volume, formamide, about 5 to 20%, by volume, calcium chloride solution, containing 50 grams calcium chloride per liter, and the balance water; and about 20 to 58%, by volume, of a cement slurry comprising Portland cement and water in a cement to water weight ratio range of about 1.0:0.8 to 4.5 and the ratio of milliliters of silicate to grams of cement is at least 1:1.

References Cited

UNITED STATES PATENTS

| | | | |
|---|---|---|---|
| 2,393,597 | 1/1946 | Drummond | 106—76 |
| 2,709,835 | 6/1955 | Frese | 106—76 |
| 2,968,572 | 1/1961 | Peeler | 106—74 |
| 3,126,290 | 3/1964 | Hemwall | 106—90 |

HELEN M. McCARTHY, *Primary Examiner.*

TOBIAS E. LEVOW, *Examiner.*

S. E. MOTT, *Assistant Examiner.*